Dec. 12, 1950  E. N. DINGLEY, JR  2,533,229
OMNIDIRECTIONAL RADIO BEACON
Filed June 25, 1947  3 Sheets-Sheet 1

INVENTOR
EDWARD N. DINGLEY JR.

BY *[signature]*

Attorney

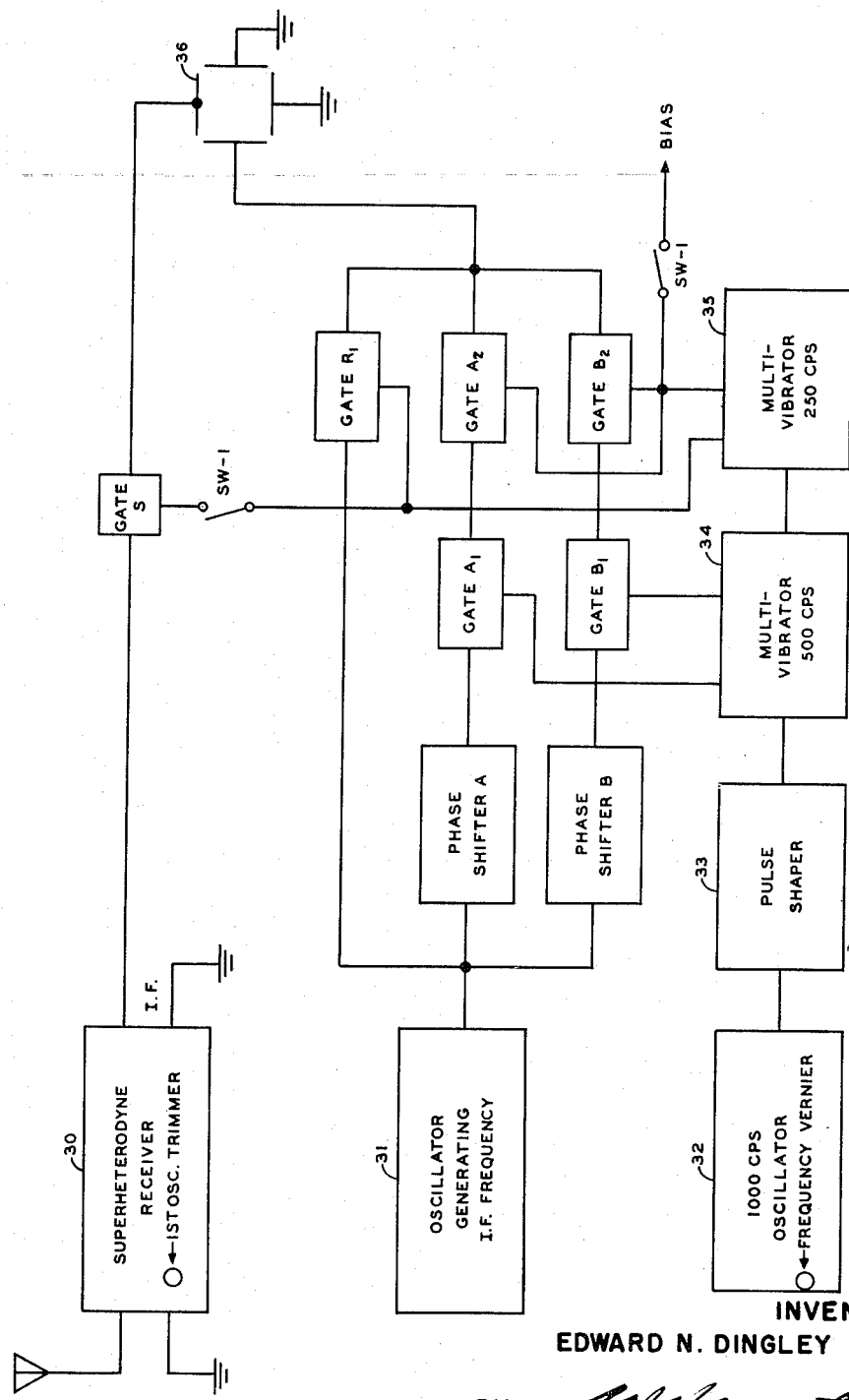

Patented Dec. 12, 1950

2,533,229

UNITED STATES PATENT OFFICE 2,533,229

OMNIDIRECTIONAL RADIO BEACON

Edward N. Dingley, Jr., Arlington, Va.

Application June 25, 1947, Serial No. 757,042

10 Claims. (Cl. 343—105)

(Granted under the act of March 3, 1883, as amended April 30, 1928; 370 O. G. 757)

This invention relates to an improved long range omnidirectional radio beacon system whereby the bearing or azimuth of the moving body may be determined in relation to the known location of the beacon.

One of the objects of the invention is to provide an improved means for radiating in space an electromagnetic field having a characteristic which varies as a known function of the azimuth from the radiating source.

Another object of the invention is to provide an improved means for receiving and detecting an electromagnetic field which varies as a function of azimuth, and for utilizing the variable characteristic of the electromagnetic field to indicate the azimuth of the receiver from the transmitter or beacon.

Other and further objects of the invention will be understood from the following specification and by reference to the accompanying drawings of which:

Fig. 3 is a block diagram of the receiver and indicator.

Figure 1:
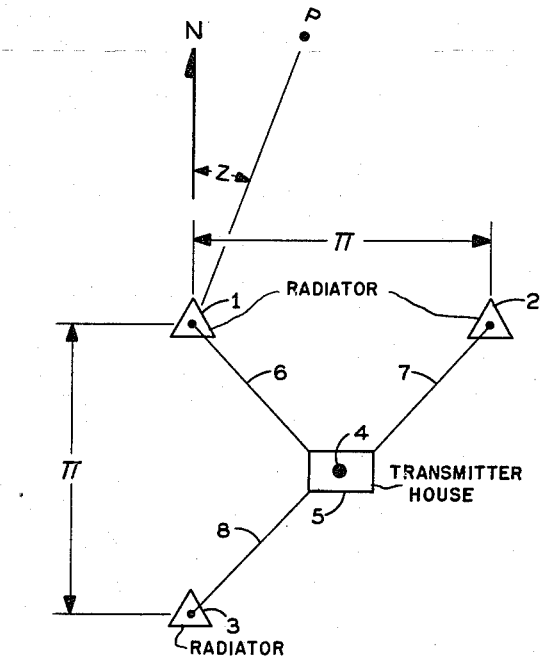
Fig. 1 is a plan view of the transmitting site.

In Fig. 1, the vertical radiators 2 and 3 are situated so that their bases, referred to the horizontal plane, are at equal distances from and in space quadrature to the base of the vertical radiator 1. Although various spacings and spac-angular relationships may be used, it is preferable to use radiators of equal height situated as stated above and with radiators 2 and 3 each spaced from radiator 1 by a distance equal to ½ wavelength = $\gamma/2$ at the assigned trnasmission frequency. This spacing is equivalent to an electrical phase difference of $\pi$ radians or 180 electrical degrees for a wave traveling from radiator 1 to radiators 2 and 3, respectively. For convenience in later discussion, a line connecting radiators 3 and 1 is shown to bear true north.

Figure 2:
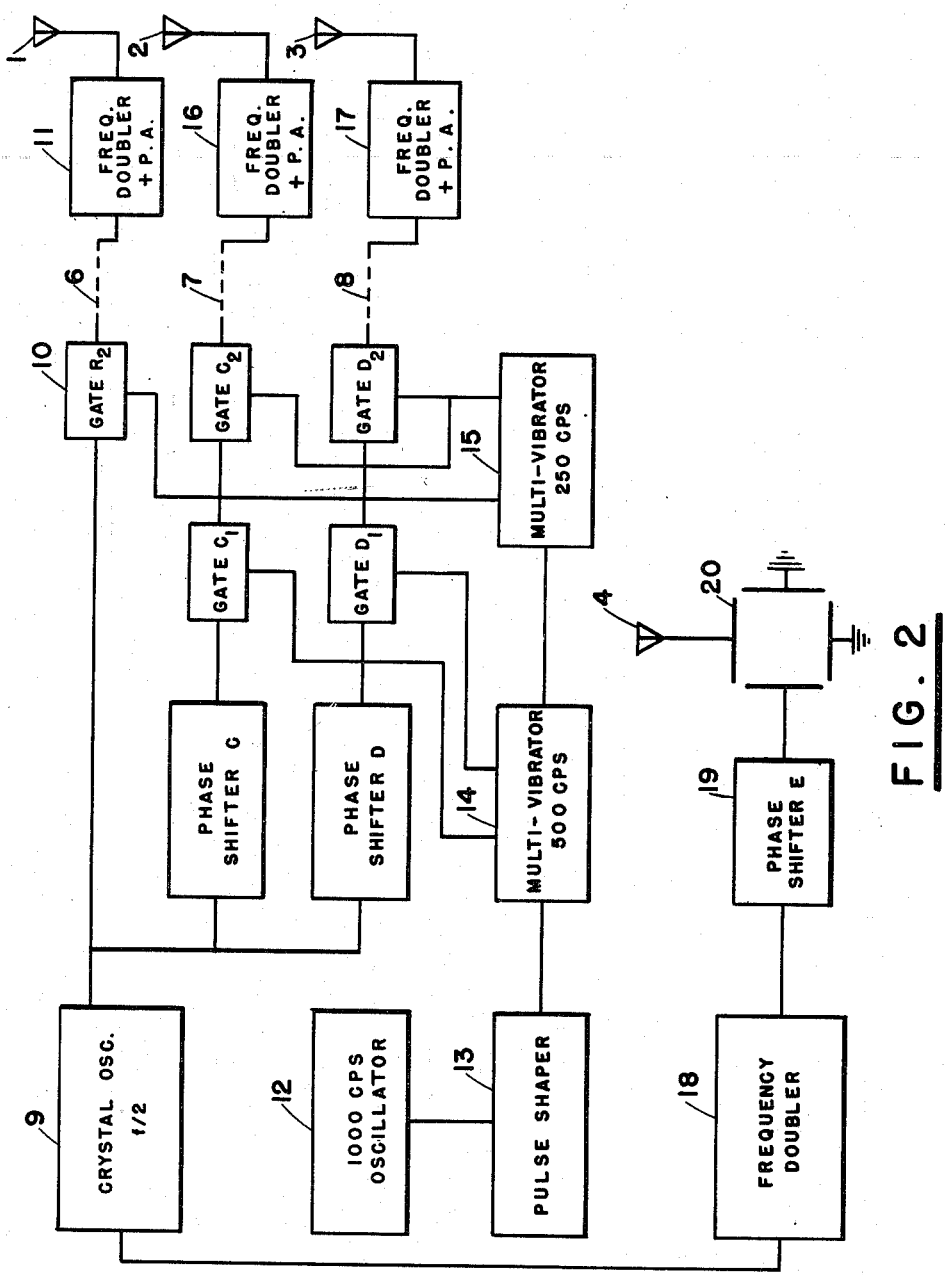
Fig. 2 is a block diagram of the transmitting equipment.

In Fig. 1, symbol 5 represents the house or enclosure for all of the transmitting equipment shown in Fig. 2; symbol 4 represents a short vertical receiving antenna situated equidistant from radiators 1, 2 and 3 and symbols 6, 7 and 8 represent buried coaxial transmission lines which are further depicted in Fig. 2.

The transmitting equipment is arranged so that radiation of the assigned frequency occurs only from radiator 1 during the period $T_1$, only from radiator 2 during the period $T_2$, and only from radiator 3 during the period $T_3$, and then the cycle repeats. These periods may, within certain limits, be as long as desired. In the following specification the periods will be assigned as follows $T_1=2$ milliseconds, $T_2=T_3=1$ millisecond. The radiations from the three antennas are in time phase with each other.

Although any desired radiation frequency may be used in the practice of this invention, it is preferable to use low frequencies to achieve the most useful results at distance as great as 1500 to 2000 miles. Frequencies in the band 100 to 250 kc./s. are preferred. In the following description, an assigned frequency of 200 kc./s. will be assumed.

In Fig. 1, let P be a point at or near the earth's surface sufficiently distant from radiator 1 so that lines joining point P to radiators 1, 2 and 3 are substantially parallel. In the following, these lines will be considered to be parallel.

In Fig. 1, let Z be the angle between the line joining point P with antenna 1, and the extended line joining antennas 1 and 3. With reference to north, this may be termed the azimuth angle of point P.

The signals received at point P from the three antennas may be expressed as follows:

$$E_1 = KIe^{jwt}]T_1$$
$$E_2 = KIe^{j(wt+\pi \sin Z)}]T_2$$
$$E_3 = KIe^{j(wt-\pi \cos Z)}]T_3$$

Where $E_1$, $E_2$, $E_3$ = instantaneous field intensity due to antennas 1, 2, and 3 respectively.
Where K = a constant
Where I = current in antenna 1 or 2 or 3
Where $e$ = base of Naperian logarithms
Where W = radiated frequency in radians per second
Where Z = azimuth of point P
Where $]T_1$ indicates that the value holds during period $T_1$ but at other times the value is zero.

In more simple terms, the field intensity at the point P is constant regardless of which radiator is radiating and the phase of the electromagnetic field due to radiator 2, referenced to that previously received from radiator 1 is:

$$\phi_2 = \pi \sin Z \qquad (1)$$

And the phase of the electromagnetic field due to radiator 3, referenced to that previously received from radiator 1 is:

$$\phi_3 = -\pi \cos Z \qquad (2)$$

Figure 1A:
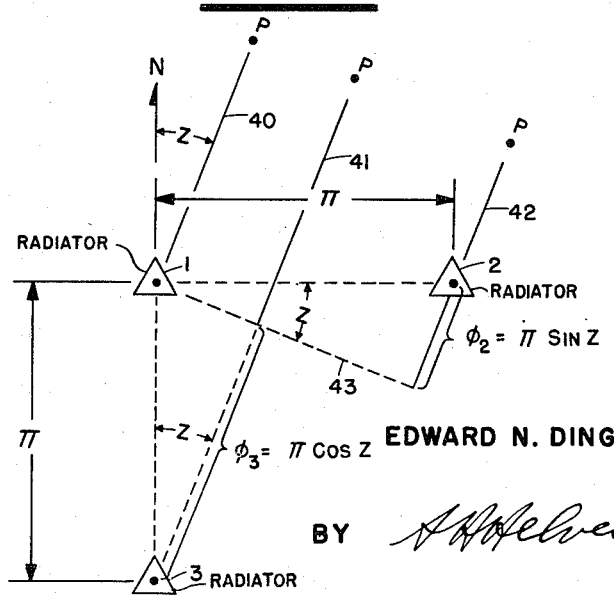
Fig. 1a is a diagram illustrating certain phase relationships.

This will become apparent from a study of Fig. 1a which is a geometrical representation of the phase relationships between the various electromagnetic fields as they arrive at point P. Point P has been assumed to be so far away that the lines 40, 41 and 42 joining point P to radiators 1, 2 and 3 respectively are substantially parallel, as shown. By drawing the line 43 at right angles to line 40, it is apparent that the electromagnetic field from radiator 2 will lead that from radiator 1 when both fields arrive at point P by an electrical angle $\phi_2$ which is seen, by inspection, to be equal to $\pi \sin Z$. Similarly, the electromagnetic field from radiator 3 lags the electromagnetic field from radiator 1 upon arrival at point P by an electrical angle $\phi_3$ which, by inspection, equals $\pi \cos Z$.

If point P is 45 wavelengths removed from radiator 1, the error in the above expressions will be less than 1 electrical degree. At a frequency of 200 kc./s., 45 wavelengths is approximately 35 nautical miles. At greater distances the error in the above equations is negligible.

Fig. 2 is a block diagram of the apparatus required at the transmitting station. In this figure, symbol 9 represents a crystal controlled oscillator of conventional design such as is described on page 496 of "Radio Engineers Handbook," first edition, by F. E. Terman, published by McGraw-Hill Co. Symbol 10 represents a keyed amplifier or "gate" such as is shown in Fig. 4d, page 628 of Terman, supra, except that the keying or gating voltage is obtained from the multivibrator 15 to be later described. The output of gate 10 is transmitted through transmission line 6 to the frequency doubler power amplifier 11 which is located at the base of radiator tower 1 and is of conventional design. The use of half carrier frequency in the transmission line eliminates feedback therein from the radiated field. The power amplifier 11 energizes the radiator 1 during period $T_1$. During periods $T_2$ and $T_3$, gate $R_2$ (symbol 10) blocks the passage of energy to transmission line 6.

In Fig. 2, phase shifters C and D are of conventional design such as is shown in Fig. 56e on page 949 of Terman, supra.

Signals from the crystal oscillator 9 pass through phase shifter C and through gates $C_1$ and $C_2$, which are similar in design to gate $R_2$, through transmission line 7 to the frequency doubler power amplifier 16 which energizes radiator 2 only during the period $T_2$ for the reason that exciting energy is blocked from transmission line 7 during the period $T_1$ by gate $C_2$ and during the period $T_3$ by gate $C_1$.

Radiator 3 is energized in a similar manner by the frequency doubler power amplifier 17 through the phase shifter D. Its radiation is stopped during the period $T_1$ by the gate $D_2$ and during the period $T_2$ by the gate $D_1$.

In Fig. 2, symbol 12 represents an oscillator of conventional design which drives a pulse shaper 13 of conventional design such as is shown in Fig. 34a on page 514 of Terman, supra. Pulse shaper 13 drives multivibrator 14 at half the oscillator frequency and multivibrator 14 drives the multivibrator 15 at one-quarter the oscillator frequency. In this example the frequency of oscillator 12 is taken as 1000 C. P. S. and the half cycle period of multivibrator 14 is 1 millisecond and that of multivibrator 15 is 2 milliseconds. The plate of one tube of multivibrator 15 supplies blocking voltages to gates $C_2$ and $D_2$ during period $T_1 = 2$ milliseconds and the plate of the other tube of multivibrator 15 supplies blocking voltage to gate $R_2$ during period $T_2 + T_3 = 2$ milliseconds. The plate of one tube of multivibrator 14 supplies blocking voltage to gate $D_1$ during the first half of period $T_1$ and during period $T_2$. The plate of the other tube of multivibrator 14 supplies blocking voltage to gate $C_1$ during the second half of period $T_1$ and during period $T_3$. Thus signals will reach transmission line 7 during period $T_2$ and will reach transmission line 8 during period $T_3$ but those signals are blocked during the period $T_1$ by the action of gates $C_2$ and $D_2$.

In Fig. 2, some of the signal output of oscillator 9 is passed through the frequency doubler 18, the phase shifter E (symbol 19) and to the horizontal deflection plates of cathode ray tube 20. This signal is displayed in space quadrature with the signal collected by antenna 4 which is equidistant from antennas 1, 2 and 3. The frequency doubler 18 consists of a conventional biased vacuum tube circuit in which the plate circuit is tuned to the second harmonic of the input frequency. The phase shifter E is similar to phase shifters C and D.

The figure displayed on the screen of the cathode ray tube 20 will be a measure of the phase relationships between the electromagnetic fields radiated by radiators 1, 2 and 3. If these fields are in time phase, then the voltage of collector 4 will have a fixed phase relationship to the output of phase shifter 19, regardless of which radiator is energized. This phase relationship may be made zero by adjusting phase shifter 19 and the figure displayed on the cathode ray tube 20 will be a straight line as shown under the heading "Phase Difference = 0°" in Figure 55, page 948 of Terman, supra. If the fields of radiators 1, 2, and 3 are not in time phase, then the voltage of collector 4 will have differing phase relationships with the output of phase shifter 19, depending on which radiator is energized. For example, these phase relationships might be 45°, 90°, and 135° respectively for radiators 1, 2, and 3. Since the radiators are energized sequentially, the vision persistence of the eye, and the image persistence of the screen, would make it appear that the cathode ray tube figure comprised three superimposed figures such as would result from the superpositioning of those figures shown in Figure 55, page 948 of Terman, supra, which are designated respectively as "Phase difference, 45°, 90°, and 135°." Under these circumstances, phase shifters C and D may be adjusted to co-phase radiators 2 and 3 with radiator 1 and phase shifter 19 may be adjusted to co-phase its output with that of radiator 1, whereupon the radiators, when sequentially energized, will produce superimposed straight line figures on the cathode ray tube 20. Under these conditions, any small phase difference between the energy radiated from radiators 1, 2, and 3 will be apparent by a tendency of one or more of the apparently superimposed figures to become elliptical and this tendency can be corrected by an adjustment of phase shifters C, D, or 19. A required condition for the preferred mode of operation of this radio beacon is that the fields radiated by radiators 1, 2, and 3 shall be in time phase.

Fig. 3 is a block diagram of the equipment to be carried in a moving body, aircraft, or surface vessel by means of which the phase angles $\phi_2$ and $\phi_3$ may be determined. $\phi_2$ and $\phi_3$ respectively are defined as the phase angle of the radiation field received at the point P, where the moving body is situated, from radiators 2 and 3 respectively both of which are measured in relation to the phase of the radiation received at point P from radiator 1.

In Fig. 3, the oscillator 32, pulse shaper 33, multi-vibrators 34 and 35, all gates, and all phase shifters are similar in design to those previously described as utilized in the circuits of Fig. 2. The superheterodyne receiver 30 is of conventional design such as is described on page 636 of Terman except that the second detector and audio frequency section is omitted and the intermediate frequency (I. F.) output is passed through gate S to the vertical deflection plates of the cathode ray oscilloscope tube 36.

In Fig. 3, the oscillator 31 is of conventional design. The output signal of this oscillator, at frequency IF is connected to the horizontal deflection plates of the oscilloscope tube 36 through three parallel channels as follows: 1. Through gate $R_1$; 2. Through phase shifter A, gate $A_1$ and gate $A_2$; 3. Through phase shifter B, gate $B_1$ and gate $B_2$. Although the intermediate frequency IF may have any desired value, in the following specification this value is assumed to be 75 kc./s.

In Fig. 3, the oscillator 32, pulse shaper 33, and multivibrators 34 and 35 operate in a manner identical to that described in connection with the similar devices of Fig. 2. Assume that the switch SW—1 (in two parts) is open, then gate S passes signals continually and locally generated IF signals from oscillator 31 pass through gate $R_1$ only during the period $T_1$ and are blocked by gates $A_2$ and $B_2$ during this period. These IF signals pass through gates $A_1$ and $A_2$ during period $T_2$ and are blocked by gates $R_1$ and $B_1$ during this period. These I. F. signals pass through gates $B_1$ and $B_2$ during period $T_3$ and are blocked by gates $R_1$ and $A_1$ during this period. Switch SW—1 is provided to permit the time periods $T_1$, $T_2$ and $T_3$ to be synchronized with the similar transmission periods at the transmitter. When switch SW—1 is closed, signals pass from the receiver 30 to the vertical deflection plates of oscilloscope 36 only during the period $T_1$ during which time signals from oscillator 31 also pass through gate $R_1$ to the horizontal deflection plates of the oscilloscope. Signals from the local oscillator 31 are prevented from reaching the horizontal deflection plates of the oscilloscope 36 during the periods $T_2$ and $T_3$ by the second section of switch SW—1 which places a permanent blocking bias on gates $A_2$ and $B_2$.

Under the conditions described above, if the oscillator 32 is not properly phased with the oscillator 12 at the transmitter, transmitted signals during portions of transmitter periods $T_1$, $T_2$ and $T_3$ will all be received during receiver period $T_1$ (receiver periods $T_2$ and $T_3$ having been blanked out by the closing of switch SW—1). Because the signals transmitted during these periods are not in phase (at point P), three (or sometimes two) separate superimposed figures will appear on the screen of the oscilloscope 36. The resultant will appear as if any two or three of the figures of Fig. 55, page 948 of Terman, supra, were superimposed. If these figures change shape or "roll" too rapidly, the vernier frequency control on the receiver 30 should be adjusted to make the IF frequency of the receiver 30 more nearly equal to that of oscillator 31. Next the vernier frequency control of oscillator 32 should be adjusted until only one figure such as any one of the figures of Fig. 55, page 948 of Terman, supra, is displayed by the cathode ray tube. This will occur only when the time periods $T_1$, $T_2$, and $T_3$ at the receiver are exactly synchronized with the corresponding periods at the transmitter.

Under the conditions described above, the switch SW—1 is opened and three superimposed oscilloscope figures will be observed. They will appear as if any three figures of Fig. 55, page 948 of Terman, supra, had been superimposed. Phase shifter A should now be rotated until one of the three figures is exactly superimposed on the one figure which exists when switch SW—1 is closed. Next, phase shifter B should be rotated until the remaining figure is exactly superimposed on the other two. Under these conditions, phase shifter A indicates directly the number of electrical degrees by which the phase of the radiation from radiator 2 (as received at point P) leads or lags the phase of the radiation from radiator 1. If at all transmitting stations, radiator 2 is due east and 180 electrical degrees distant from, and in time phase with, radiator 1, phase shifter A may be calibrated directly in azimuthal degrees with a double scale reading on one scale from 270 through 0 to 90 degrees true bearing and on the other scale from 270 through 180 to 90 degrees of true bearing. The azimuthal degrees corresponding to electrical degrees are readily computed from Equation 1 derived above. Any one position of the phase shifter will indicate two possible bearings.

In a similar manner, phase shifter B may be calibrated directly in azimuthal degrees with a double scale reading on one scale from 0 through 90 to 180 degrees of true bearing and on the other scale from 0 through 270 to 180 degrees of true bearing, the azimuthal degrees for the double scale being computed from Equation 2 in this case. Of the two possible bearings indicated by phase shifter A and of the two possible bearings indicated by phase shifter B, two of these bearings will be identical and represent the true bearings without ambiguity except on bearings 0, 90, 180 and 270 degrees. If, however, the spacings of the radiator towers is standardized at, say, 175 electrical degrees and the phase shifters are calibrated accordingly, there will be no ambiguity whatsoever. In the early discussion herein, a spacing of 180 electrical degrees was used to clarify the description.

Assume that the short period stability of the transmitter frequency and of the frequency of the first oscillator of the receiver 30 is one part per million and that these frequencies always drift in opposite directions, then the frequencies will drift apart 2 cycles per million cycles or 0.4 cycle per second at a carrier frequency of 200 kc./s. Assume that the short period stability of oscillator 31 is one part per million or 0.075 cycle per second at an IF frequency of 75 kc./s., and that this frequency always drifts in opposite direction to the drift of the IF frequency of the receiver 30, then the figures on the screen of the oscilloscope will revolve or "roll" at the rate of 0.475 revolution per second. The above stated oscillator stabilities are easily achieved and the figures on the screen of the oscilloscope can be easily observed while rolling as rapidly as 0.475 revolution per second. Careful adjustment of the frequency control vernier on the receiver 30 will reduce this roll to much less than this value. If the oscilloscope figures roll 0.475 revolution per second=171 electrical degrees per second, then in the four milliseconds required for each complete comparison of phases, the phases will change 0.171 electrical degree. In consequence the error of observation due to frequency instability will not exceed 0.171 electrical degree.

The rate of change of observed phase with change of azimuth varies between a maximum of one and a minimum of zero electrical degrees per arc degree. However whenever a minimum rate of change is observed from one pair of radiators, the rate of change observed from the other pair is maximum. In consequence the least directional sensitivity on any azimuth will be 0.707 electrical degree of phase shift per arc degree change in azimuth.

The theoretical azimuthal accuracy of this invention can be increased by increasing the radiator spacing in excess of 180 electrical degrees but under such conditions, undesirable azimuthal ambiguities would be encountered.

The use of this invention is not limited to distances between receiver and transmitter in excess of some 35 miles. At lesser distances a correction factor is applied to the observed azimuth to correct for the non-parallelism of the paths between the receiver and the three radiators.

It will, of course, be apparent that the electromagnetic waves radiated by the transmitters need not be in exact synchronism as long as they are in fixed time-phase relationships or isochronism and provided that the particular time-phase relationship at the point of transmittal is known at the receiving point P.

The invention described herein may be manufactured and used by or for the Government for governmental purposes without the payment of any royalty thereon or therefor.

What is claimed is:

1. The method of determining azimuthal bearing at a station comprising the steps of radiating successively in sequence from separate points mutually interspaced a fixed fraction of the radiating wavelength the complementary portions, respectively, of a continuous electro-magnetic wave train, comparing the time-phase relationship of said complementary wave portions as received at the station, and translating the variation in time-phase into degrees of azimuthal bearing.

2. The method of determining azimuthal bearing at a station comprising the steps of radiating successively in sequence from separate spaced points of known location successive portions of the electro-magnetic waves from a single oscillator, said portions having synchronous time-phase relationships, receiving said waves at said station, producing at the station two local electromagnetic wave trains of the same frequency, one being synchronized with the radiated waves, selecting successive portions of the other local wave train corresponding in time to said radiated portions, employing said selected portions, respectively, in comparing the time-phase relationship of the received waves from said spaced points at the station, and translating the variation in time-phase into degrees of azimuthal bearing.

3. The method of determining azimuthal bearing at a station with respect to three points of known location spaced at equal distances from one another and in which two of said points are substantially in space quadrature to the other comprising the steps of radiating successively in predetermined sequence from the three points complementary fractions of a single source of electromagnetic waves, said fractions having the same time-phase relationship, comparing the time-phase relationship of the fractions as received at the station with a locally produced electromagnetic wave train, and translating variations therebetween into degrees of azimuthal bearing.

4. A system for determining bearing at a point comprising, a central radiator at a known location, two radiators spaced at equal distances and substantially in space quadrature with respect to said central radiator, transmitting equipment for generating radio signals and supplying same to said three radiators in predetermined order for definite successive periods controlled by an oscillator circuit of fixed frequency, means for measuring and adjusting the time-phase relationship of the radiated signals, a superheterodyne receiver at said point for the radiated signals, a source of continuous waves having the frequency of the receiver output, oscilloscope display means having a pair of plates energized by the output of the receiver and a second pair of plates energized by said source of continuous waves, a local oscilltaor adjusted to said fixed frequency, and means controlled by the local oscillator for presenting on said display means the time-phase relationship of received signals from said radiators, respectively, and said source of continuous waves.

5. A system for determining bearing of a station comprising a central radiator of known location, two other radiators spaced equal distance and in space quadrature with respect to the central radiator, transmitting equipment for generating radio signals of a predetermined frequency and furnishing same to the three radiators in predetermined order for definite successive periods, receiving means at said station including a receiver for waves of said predetermined frequency, a source of continuous waves of the same frequency as the output of said receiver, three transmission channels for said continuous waves, gating means limiting passage of the continuous waves to each of the channels, respectively, for periods corresponding to one of said definite successive periods, phase shifters in at least two said channels which are calibrated to indicate the bearing of the station when the phase shifters are adjusted to match the phases of the radio signals received from the radiators.

6. A system for determining bearing of a station comprising, a radiator at a reference location, two radiators disposed in quadrature and equidistant from said reference radiator, transmitting equipment energizing the three said radiators in succession from the output of a single fixed frequency oscillator during respective complementary fractions of time, means adjusting the time-phases of the radiations from said radiators to coincidence, means at said station for receiving the radiated signals, a local oscillator at the station operating at the output frequency of said receiving means, gating means selecting fractions of the local oscillation corresponding to said complementary fractions of time, respectively, and means comparing the phases of the signals received from the three radiators, respectively, with the phases of the selected fractions of the local oscillation.

7. The system of claim 6 including phase shifting means for each said selected fraction of the local oscillation, and means calibrating in azimuthal degrees the amount of said phase shift required to achieve phase coincidence of local and received signals.

8. The system of claim 6 wherein the radiated signals from said radiators are limited in duration by gating circuits individual thereto, said gating circuits being operative in response to multi-vibrator valves controlled from a fixed frequency oscillator independent of said single fixed frequency oscillator.

9. The system of claim 8 wherein the gating means at said station is controlled by multi-vibrator valves controlled from a second fixed frequency oscillator at the station similar to first said valves and oscillator for selection of identical and coincident complementary fractions of time with said gated energization times of the respective radiators.

10. The system of claim 6 wherein the receiving means includes a superheterodyne receiver converting the received signals to a beat frequency, said local oscillator at the station operates substantially at said beat frequency, and said frequency comparing means comprises an oscilloscope having a pair of plates energized by the beat frequency and a second pair of plates energized by said selected fractions of the local oscillation.

EDWARD N. DINGLEY, Jr.

REFERENCES CITED

The following references are of record in the file of this patent:

UNITED STATES PATENTS

| Number | Name | Date |
| --- | --- | --- |
| 2,144,203 | Shanklin | Jan. 17, 1939 |
| 2,198,113 | Holmes | Apr. 22, 1940 |
| 2,218,907 | Donnelly et al. | Oct. 22, 1940 |
| 2,403,626 | Wolff et al. | July 9, 1946 |
| 2,403,727 | Longhren | July 9, 1946 |
| 2,411,518 | Busignies | Nov. 26, 1946 |
| 2,413,637 | Longhren | Dec. 31, 1946 |
| 2,419,525 | Alford | Apr. 29, 1947 |
| 2,422,100 | Hoff | June 10, 1947 |
| 2,490,394 | Williams | Dec. 6, 1949 |
| 2,502,662 | Mitchell et al | Apr. 4, 1950 |

FOREIGN PATENTS

| Number | Country | Date |
| --- | --- | --- |
| 546,000 | Germany | Feb. 18, 1932 |
| 579,346 | Great Britain | July 31, 1946 |